United States Patent [19]

Lippert et al.

[11] 4,065,339

[45] Dec. 27, 1977

[54] PROCESS FOR PRODUCING FIBRE REINFORCED PLASTIC TUBES WITH FLANGES

[75] Inventors: Axel Lippert; Siegfried Joisten; Johannes-Otto Sajben, all of Krefeld, Germany

[73] Assignee: Bayer Aktiengesellschaft, Leverkusen, Germany

[21] Appl. No.: 620,894

[22] Filed: Oct. 8, 1975

Related U.S. Application Data

[62] Division of Ser. No. 324,043, Jan. 16, 1973, Pat. No. 3,920,049.

[30] Foreign Application Priority Data

Jan. 18, 1972  Germany .............................. 2202125

[51] Int. Cl.$^2$ ........................... B32B 1/10; B05D 3/12
[52] U.S. Cl. .................................... 156/149; 156/227; 285/405; 285/423; 427/176; 427/293; 427/390 R
[58] Field of Search ............... 156/148, 149, 173, 191, 156/227; 427/176, 286, 293; 285/423, 405; 138/109

[56] References Cited

U.S. PATENT DOCUMENTS

| | | | |
|---|---|---|---|
| 92,353 | 7/1869 | Perry et al. ......................... | 156/227 |
| 1,696,435 | 12/1928 | Fraley .................................. | 285/229 |
| 2,752,952 | 7/1956 | Dauphinais ......................... | 138/53 |
| 2,781,277 | 2/1957 | Dwyer .............................. | 427/293 X |
| 2,783,173 | 2/1957 | Walker et al. .................... | 138/144 X |
| 2,862,524 | 12/1958 | Smith ................................. | 138/144 |
| 3,030,252 | 4/1962 | Edgerly et al. .................... | 156/191 X |
| 3,037,798 | 6/1962 | Cooper ............................... | 138/126 X |
| 3,093,160 | 6/1963 | Boggs ................................ | 138/125 X |
| 3,104,839 | 9/1963 | Krupp et al. ....................... | 138/144 |
| 3,305,251 | 2/1967 | Skinner ............................... | 285/229 |
| 3,365,203 | 1/1968 | Wallis ............................... | 138/125 X |
| 3,654,967 | 4/1972 | Atwell ............................... | 138/144 |
| 3,812,885 | 5/1974 | Sajben et al. ..................... | 138/125 |

Primary Examiner—Ronald H. Smith
Assistant Examiner—Evan K. Lawrence
Attorney, Agent, or Firm—Burgess, Dinklage & Sprung

[57] ABSTRACT

A process for producing fibre-reinforced plastic tubes outfitted with flanges, wherein a tube is continuously knit and coated with a duroplastic material in free-flowing form, and the duroplastic material is subsequently hardened. The application of duroplastic material to the knitted tube is halted at intervals for periods which, allowing for the particular rate of production of the plastic tube, correspond to the period of time in which a piece of knitted fabric sufficient for the production of two flanges is produced. The uncoated piece of knitted fabric is cut in the middle and flanges are formed one at a time in a separate operation in which the knitted fabric is stretched radially outwards and impregnated with duroplastic material which thereafter hardens.

6 Claims, 3 Drawing Figures

PROCESS FOR PRODUCING FIBRE REINFORCED PLASTIC TUBES WITH FLANGES

This is a division of application Ser. No. 324,043 filed Jan. 16, 1973, now U.S. Pat. No. 3,920,049.

BACKGROUND OF THE INVENTION

1. Field of the Invention

This invention relates to a fibre-reinforced plastic tube which is or is not provided with an inner liner which consists of a duroplastic material with a fibre reinforcement of at least one tubular, endless knitted fabric impregnated with the duroplastic material.

2. Description of the Prior Art

A fibre-reinforced plastic tube can be porduced by coating a core or an inner liner with duroplastic material in free flowing form, whereafter a fibre reinforcement is applied to and impregnated by the duroplastic coating, and the duroplastic material is subsequently hardened, the fibre reinforcement being produced by knitting a fabric tube around the core or inner liner.

A plastic tube formed by such a process is disclosed in an application of two of us, assigned to the assignee hereof U.S. Ser. No. 184,844, filed Sept. 29, 1971, of Sajben et al., now U.S. Pat. No. 3,812,885.

SUMMARY OF THE INVENTION

The object of the invention is to provide a tube of this kind with flanges and to develop a process for producing a flanged plastic tube of this kind.

It would be possible to apply flanges where required to the tube section in the usual way by lamination or bonding. However, it has been found in practice, particularly in the case of high-strength tubes, that this type of connection between tube section and flange fails much earlier than the tubes themselves.

Accordingly, one particular feature of the objective referred to above is to provide a flanged plastic tube in which the flanges are at least as strong as the tube section itself.

According to the present invention, there is provided a fibre-reinforced plastic tube, comprising a duroplastic material with a fibre reinforcement of at least one tubular, endless knitted fabric impregnated with the duroplastic material, wherein the ends of the tube are provided with flanges, the endless tubular knitted fabric extending radially outwards into the flange and being impregnated with a duroplastic material. In this way, the tube section merges directly with the flange. In general, several layers of knitted fabric are provided, the arrangement being for example that the outermost layer of knitted fabric is first folded over at its end so that the overlap rests on the outermost layer of knitted fabric itself, after which the underlying layers of knitted fabric, looking from outside to inside, are each folded back over the preceding layer so that, in the flange itself, the innermost layer of knitted fabric lies the furthest outside. This is quite possible because, by virtue of its elasticity, the knitted fabric is resilient. The entire assembly is impregnated with a duroplastic material which is preferably the same as that of the tube section.

BRIEF DESCRIPTION OF THE DRAWING

Two ends of the flanged plastics tube according to the invention are shown purely diagrammatically in section in the accompanying drawings, wherein.

DESCRIPTION OF THE PREFERRED EMBODIMENTS

Figure 1:
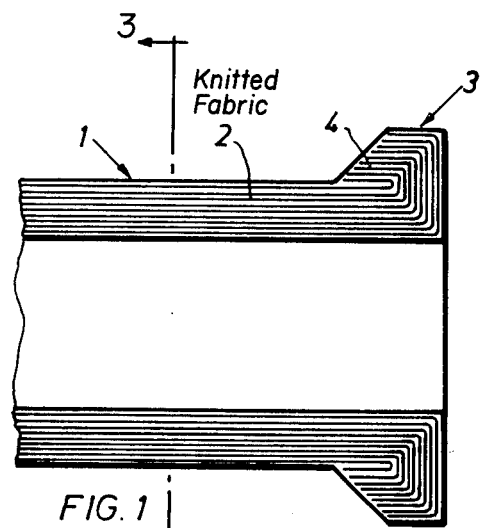
FIG. 1 shows a tube end having a flange without an insert.

In one particular embodiment of the plastics tube according to the invention, that part of the knitted fabric which extends radially outwards is backed by a circular insert. This increases the strength of the flange.

The knitted fabric preferably surrounds the insert so that the insert is locked in by the knitted fabric. Particularly high strengths are obtained in this way.

Where an insert is used, it preferably consists of a fabric or fibre preform which is impregnated with duroplastic material. Alternatively, it is possible to use inserts of solid materials such as metals or plastics.

According to the present invention, there is also provided a process for producing a fibre-reinforced plastic tube, wherein a fabric tube is continuously knitted around a core or inner liner and coated with a duroplastic material in free-flowing form, and the duroplastic material is subsequently hardened, the application of duroplastic material to the knitted tube being halted at intervals for periods which, allowing for the particular rate of production of the plastic tube, correspond to the period of time in which a piece of knitted fabric sufficient for the production of two flanges is produced, the uncoated piece of knitted fabric being cut in the middle and flanges being formed one at a time in a separate operation in which the knitted fabric is stretched radially outwards and impregnated with duroplastic material which hardens, the surplus inner liner present, if any, optionally having been cut off beforehand.

It is possible in this way to obtain a particularly rational and simple method of production which guarantees the production of high-strength flanges.

In cases where the flange surfaces are required to consist of the same material as the inner liner, if an inner liner is present, it is possible in accordance with the process to radially stretch an elastic inner liner before impregnation of the knitted fabric of the flange to be produced.

To produce flanges with reinforcing inserts, it is possible in accordance with the process for a circular insert to be pushed onto the knitted fabric and for the projecting piece of fabric to be folded at least partly circularly over the insert. This is possible through the elasticity of the knitted fabric and, at the same time, provides for the firm holding of the insert. In one particularly favourable embodiment, the knitted fabric is drawn completely over the insert until it rests on the outer wall of the already produced tube. In this way, the flange formed onto the tube has a relatively large connecting surface with the end of the tube so that it is much more difficult to break off. In these embodiments as well, the knitted fabric and optionally the insert, providing it consists of a fabric or fibre preform, are of course also impregnated with the duroplastic material.

Just as in the production of a plastic tube, unsaturated reactive polyester resins and reactive epoxide resins, for example, are used as the duroplastic materials. The knitted fabric and also the circular inserts, if any, preferably consist of carbon fibres, reed fibres, synthetic fibres based on polyamide or polyvinyl chloride for example. Fine-denier metallic fibres are also suitable.

FIG. 1 shows the end of a tube 1 reinforced by tubular layers 2 of knitted fabric. These layers of knitted fabric are folded back radially outwards in the vicinity of a flange 3, each forming an overlap 4.

Figure 3:
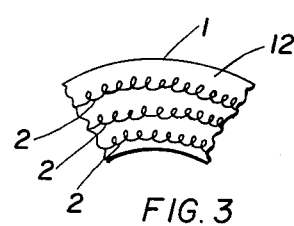
FIG. 3 is a cross section taken on line 3—3 of FIG. 1.

As is shown in FIG. 3, tube 1 is composed of duroplastic material 12, having embedded therein knitted tube which form the layers 2.

Figure 2:
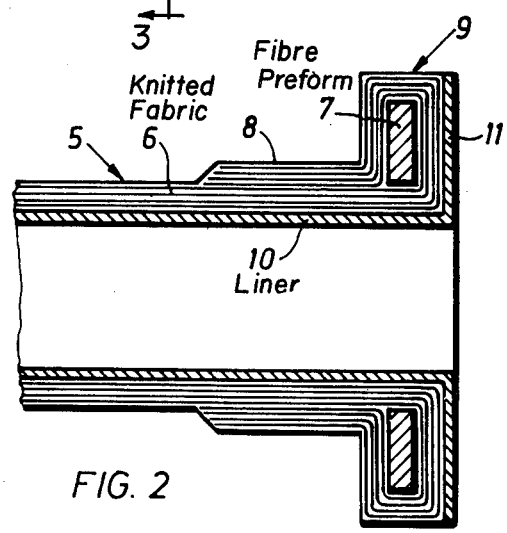
FIG. 2 shows a tube end having a flange with an insert.

FIG. 2 shows the end of a tube 5 which is reinforced by tubular knitted fabric 6 which is drawn around an insert 7 into contact with the outer surface of the tube 5, reinforcing it at 8. A flange 9 is situated in the vicinity of the insert 7. The knitted fabric 6 and the insert 7 consisting of a fibre preform are impregnated with an epoxide resin which has been hardened. An inner liner 10 which consists of rubber is provided to protect the epoxide resin against corrosive media flowing through the pipe, the inner liner 10 being folded or stretched radially outwards so that the flange surface 11 also consists of rubber, which is bonded to the epoxide resin.

What we claim is:

1. In a process for producing fibre-reinforced plastic tubes, wherein a fabric tube is continuously knitted and coated with a duroplastic material in free-flowing form, and the duroplastic material is subsequently hardened, the improvement for providing the tubes with flanges, which comprises halting the application of duroplastic material to the knitted tube for a period of time in which a piece of knitted fabric sufficient for the production of two flanges is produced, cutting the uncoated piece of knitted fabric in the middle to provide two uncoated end portions of knitted fabric and forming a flange from each of said end portions by stretching each end portion radially outwardly, impregnating each stretched end portion with duroplastic material, and allowing the duroplastic material to harden.

2. A process as claimed in claim 1, wherein the fabric tube is continuously knitted around an elastic inner liner, and after said cutting, each extension of the inner liner corresponding to the flanges is radially stretched before impregnation of each stretched end portion of the knitted fabric corresponding to the flange to be produced, so that each extension of one inner liner forms a surface of the flange and each stretched end portion is then impregnated with duroplastic material and the duroplastic material is hardened so that each stretched extension of the inner liner is bonded to the duroplastic material.

3. A process as claimed in claim 1, wherein prior to impregnating each stretched end portion, a circular reinforcing insert is pushed onto the knitted fabric corresponding to the flange and the projecting piece of knitted fabric is folded at least partly about the insert.

4. A process as claimed in claim 3, wherein the knitted fabric corresponding to the flange is drawn completely over the insert until it rests on the outer wall of the fabric tube.

5. A process for producing a flange on a fibre-reinforced plastic tube, wherein a fabric tube is knitted and impregnated with a duroplastic material in free-flowing form, and the duroplastic material is subsequently hardened, the application of duroplastic material being halted while the knitting of the tube is continued to provide a terminal piece of uncoated knitted fabric sufficient to form a flange, and forming the flange by steps comprising stretching the resulting uncoated piece of knitted fabric radially outwards, impregnating the stretched fabric with duroplastic material and allowing the duroplastic material to harden.

6. In a process for producing fibre-reinforced plastic tubes wherein a fabric tube is knitted and impregnated with a duroplastic material in free-flowing form, and the duroplastic material is subsequently hardened, the improvement for providing the tubes with flanges, which comprises halting the application of duroplastic material to the knitted tube for a period of time in which a piece of knitted fabric sufficient for the production of two flanges is produced, cutting the uncoated piece of knitted fabric in the middle providing two tube end portions each comprising an uncoated piece of knitted fabric, and forming a flange from each of said end portions by stretching the end portion radially outwardly, impregnating the stretched end portion with duroplastic material, and allowing the duroplastic material to harden.

* * * * *